Figure 1:
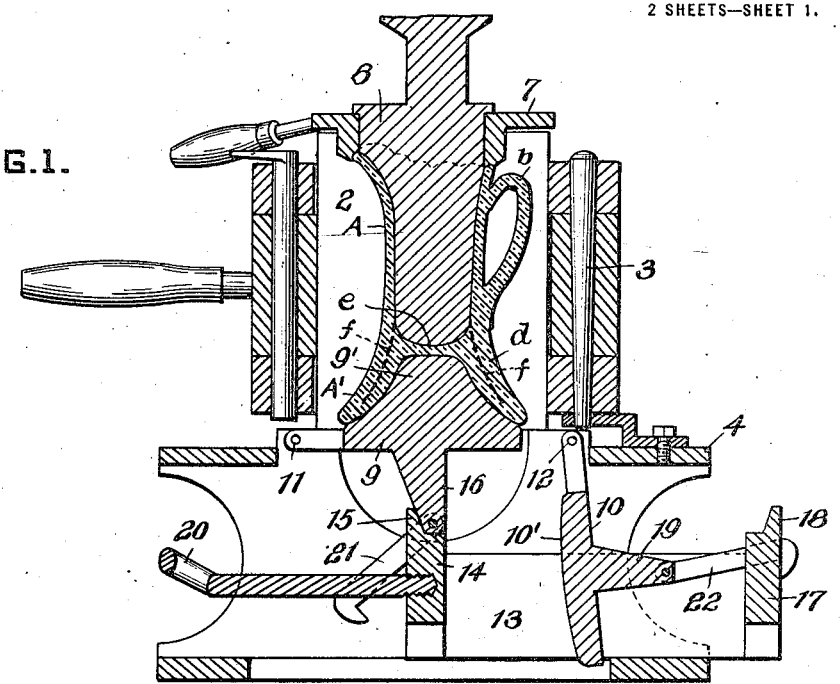

T. C. STEIMER
MANUFACTURE OF HOLLOW GLASS ARTICLES.
APPLICATION FILED MAR. 28, 1914.

1,165,212.

Patented Dec. 21, 1915
2 SHEETS—SHEET 1.

WITNESSES
J. Herbert Bradley
Ella McConnell

INVENTOR
T. C. Steimer
By Knobit & Doolittle
Attys

T. C. STEIMER.
MANUFACTURE OF HOLLOW GLASS ARTICLES.
APPLICATION FILED MAR. 28, 1914.

1,165,212.

Patented Dec. 21, 1915
2 SHEETS—SHEET 2.

WITNESSES

INVENTOR

UNITED STATES PATENT OFFICE.

THEODORE C. STEIMER, OF KNOXVILLE, PENNSYLVANIA, ASSIGNOR TO UNITED STATES GLASS COMPANY, OF PITTSBURGH, PENNSYLVANIA, A CORPORATION OF PENNSYLVANIA.

MANUFACTURE OF HOLLOW GLASS ARTICLES.

1,165,212.  Specification of Letters Patent.  Patented Dec. 21, 1915.

Application filed March 28, 1914. Serial No. 827,884.

*To all whom it may concern:*

Be it known that I, THEODORE C. STEIMER, a citizen of the United States, and resident of Knoxville, in the county of Allegheny and State of Pennsylvania, have invented certain new and useful Improvements in the Manufacture of Hollow Glass Articles, of which the following is a specification.

The primary object of this invention is to improve and facilitate the manufacture of hollow glass articles which owing to their form cannot be fully shaped by pressing, making necessary a supplemental blowing operation.

The invention is particularly applicable to articles of smaller cross-sectional area adjacent their upper ends than distant from said ends, for instance a pitcher having a belted or contracted upper portion, and a swollen or enlarged lower portion which latter is possible only by blowing.

A characteristic of the invention is that the pressing operation determines that dimension of the article which is longitudinal of the direction in which pressure is applied, and the mold and plunger are of such form as to give final shape to a portion of the article, the glass for the remaining portion being so disposed by the pressing operation that when subjected to air pressure it will spread or flow as may be required to complete the article, the latter taking place after the mold area has been increased sufficiently to fully form the blown portion of the article.

The invention may be variously applied. In the adaptation here shown, the length and the exterior configuration of the finished article, saving and excepting its bottom, are determined and fully defined by the pressing operation, the external shape thus secured including that portion of the article which ultimately is of larger internal cross-sectional area than the portion whose internal shape is defined by the shape of the plunger. Immediately following the plunger-pressing operation, the mold cavity is enlarged to provide space for so distending the glass, theretofore properly distributed by the action of the plunger, as to permit of such spreading or expansion by blowing as may be necessary to form the larger area of the completed article.

The invention is also directed to apparatus of improved construction for practising the invention in the manufacture of those forms of hollow articles in which the entire external shape, excepting the bottom, is determined by the pressing operation.

Figure 2:
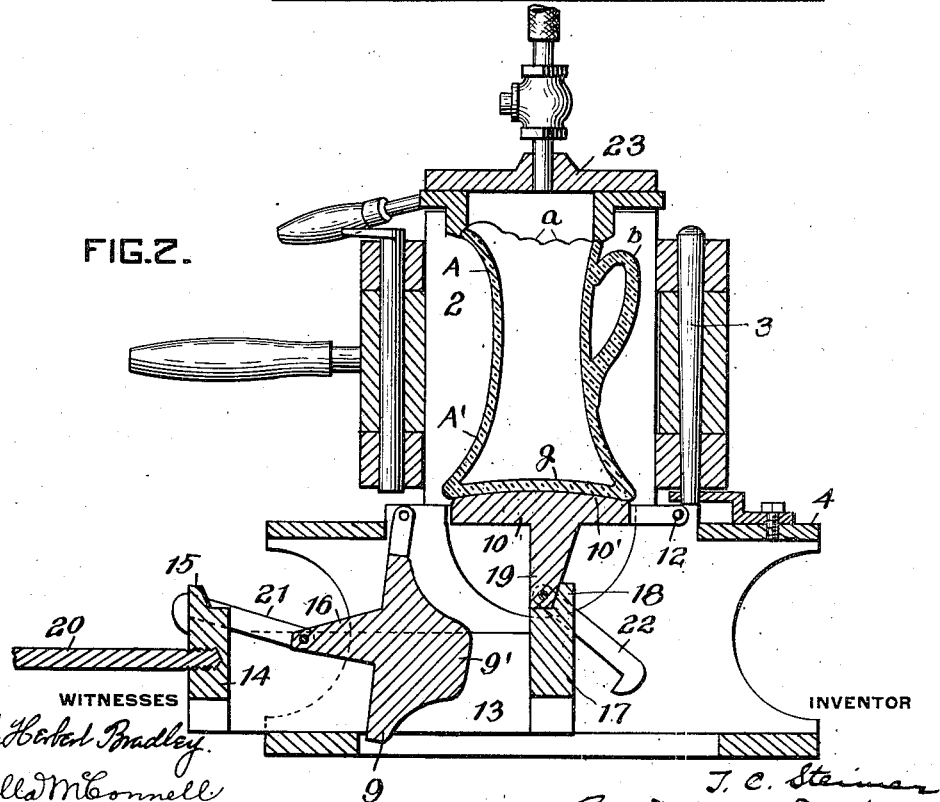
Figure 3:
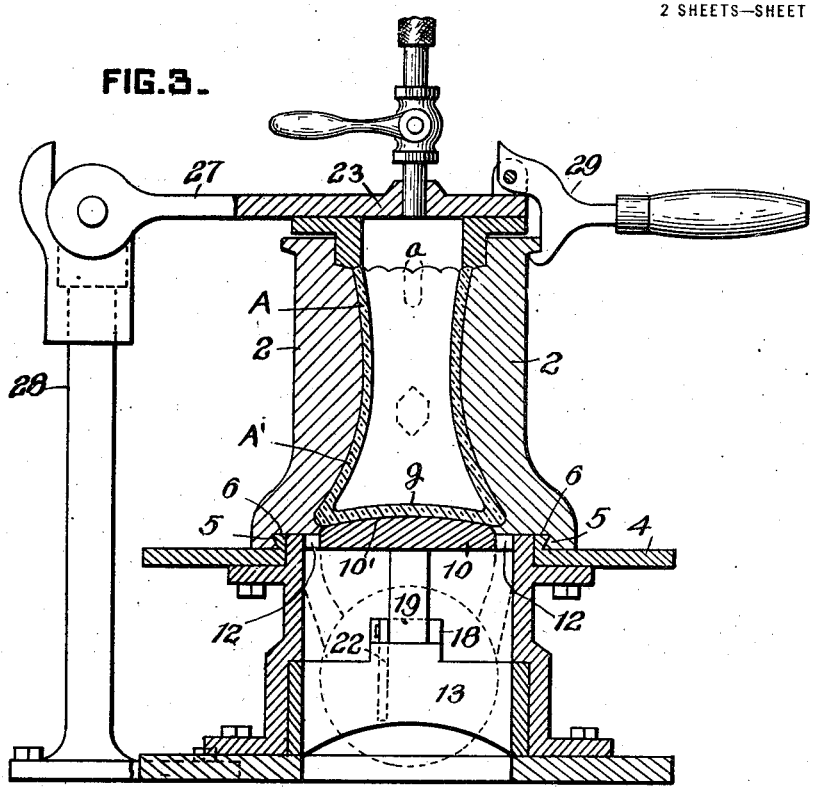
Figure 4:
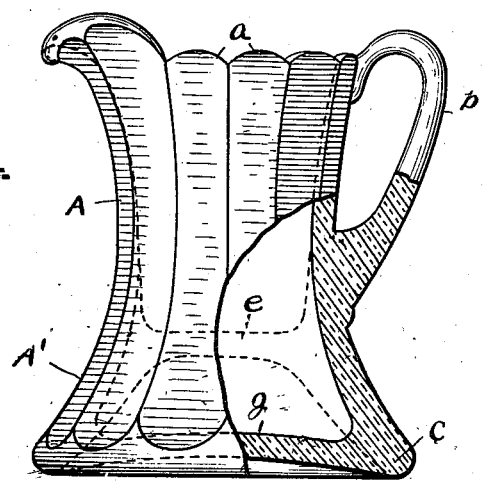

In the accompanying drawings, Figure 1 is a vertical section of apparatus suitable for practising the invention, showing the position of the parts and the disposition of the glass at the completion of the pressing operation, and Fig. 2 is a similar view at the completion of the blowing operation. Fig. 3 is a vertical cross-section taken at right angles to Fig. 2. Fig. 4 is a view of the completed article shown partly in section and partly in elevation, and illustrating in dotted lines the disposition of the glass at the completion of the pressing operation and preceding the blowing operation.

Referring to the drawings, 2 are duplicate side wall parts of a vertically divided mold, hinged together at 3 and mounted to open and close on base or stand 4, the lower extremity of the walls being dove-tailed at 5 to close tightly around the similarly formed flange or boss 6 projecting from the base, all as well known in the art.

7 is the mold ring fitting and coöperating with the top of the mold, and 8 is a pressing plunger which may be operated by any of the well known plunger operating means. Removably fitting the lower ends of mold walls 2 are the interchangeable mold bottoms 9 and 10. Bottom 9 is formed with the rounded upward projection 9' which is adapted to extend well up into the mold, as shown in Fig. 1. The corresponding face 10' of bottom 10 is of a form to impart final shape to the bottom of the article, as shown in Fig. 2, in the present instance said face being relatively flat. It will be understood that the bottom sections 9 and 10 are interchangeable, so that with either in position the lower end of the mold is fully closed.

Bottoms 9 and 10 are hinged at 11 and 12, respectively, to base 4 at opposite sides of the sectional mold and adapted to swing downwardly in opposite directions. The base is of box-like form and movable horizontally therein is a slide 13, one end 14 of the slide being formed with the notched upward projection 15 which coöperates with arm 16 on the under side of bottom 10 for raising the latter and holding it raised, as in Fig. 1. The opposite end 17 of the slide is formed with a correspondingly notched projection 18 which similarly coöperates with arm 19 on the under side of bottom 10 for raising and holding the latter in operative position, as in Fig. 2. The slide may be manipulated by the handle rod 20. When the slide is moved to the right, as in Fig. 1, projection 15 engages arm 16 and thereby raises the mold bottom 9 into horizontal mold closing position, the extremity of arm 16 fitting the notched projection 15 in such manner as to lock the bottom immovably in such position. When the slide is moved to the left, bottom 9 is released and swings down by gravity and at the same time the notched projection 18 coöperates with arm 19 to raise bottom 10 into operative position and to lock it therein. A hook 21 pivoted to arm 16 is adapted to ride loosely on slide end 14 and serves to draw back the bottom when in lowered position and prevent swinging, as shown in Fig. 2. A similar hook 22 on arm 19 coöperates with slide end 17 and performs the same service for mold bottom 10 when the latter is in lowered position, as in Fig. 1.

In the adaptation here illustrated, a mold is shown for forming a pitcher A having a belled or enlarged lower portion A', and the mold cavity is shaped to give final form and longitudinal dimension to the exterior side surfaces. And as the dimension of the article longitudinal of the direction of pressure is determined by the pressing operation, and as the article remains in the mold until all portions thereof are given final form, it will be understood that mold sections 2 may be so cut or shaped as to impart any desired external configuration and contour. In the present instance the mold is shaped to form the article with external longitudinal flats or panels a, also to form a pitcher having the belled lower portion A'.

Mold sections 2 and plunger 8 coöperate in such manner that, in conjunction with ring 7, final shape is imparted to portions of the article by the pressing operation, in the present instance to the upper portion of the pitcher including its ornamental top edge and to its handle b, also to the exterior side portions of the article for its entire length, including its rim-like bottom edge c. It is, however, characteristic of the invention that plunger 8 is shorter than the internal depth of the finished article, so that the lower portion, save for its external contour, is unformed or unfinished by the pressing operation, and in the illustrated instance obviously could not be formed by a pressing plunger due to the belled or enlarged lower portion of the interior of the finished pitcher.

It is further characteristic of the invention that the glass which enters into the subsequently blown formation is disposed by the pressing operation in such manner as to facilitate such distension. The upwardly projecting mold bottom 9 comprises an area-contracting mold wall for that portion of the article which is not given final shape—both inside and out—by the pressing operation, and the presence of this mold bottom results in pressing the unfinished lower portion of the article with the annular relatively thick glass formation d. The outer surface of this relatively thick portion is of the finished configuration of the article, and its inner surface bears the shape of the mold bottom projection 9'. Preferably, when the plunger is fully depressed, as in Fig. 1, it is in sufficiently close proximity to projection 9' as to impart to the central portion e of the glass a thickness corresponding to that of the bottom of the finished article.

At the completion of the pressing operation an article is produced of the form shown in Fig. 1, and in dotted lines in Fig. 4. Immediately following the pressing operation bottom 9 is lowered and bottom 10 raised, as in Fig. 2, and a suitable blowing head 23 is applied to the mold ring, this without removing the article from the mold, the change in the mold bottom simply resulting in removing a mold-cavity contracting wall and substituting a mold-cavity enlarging wall for that part of the mold in which final shape is imparted to the article by the blowing operation. The blowing head may be conveniently mounted on arm 27 hinged to standard 28 and turned out of the way when not in use. A clamping lever 29 may serve to secure the head to the mold in operative position, as in Fig. 3. Upon admitting the blowing air the glass in the thickened portion d separates on the line f midway the surfaces thereof exposed to mold sections 2 and bottom portion 9', and the air pressure results in distending or spreading downwardly the glass against bottom 10 and into the final bottom formation of the article, as indicated at g, thereby imparting enlarged or belled formation to the lower portion of the article interior. The glass will part at line f under the blowing pressure because it is hottest and hence weakest midway the opposite chilled faces of the thickened portion. In effect, the thickened glass tends to split centrally and combines with the central plunger-formed part e in forming the complete bottom g. In further explanation of the splitting effect at line f, it may be stated that molten glass is always appreciably surface chilled by its contact with mold walls. The skin-like surface resulting from this chilling toughens the glass surfaces so that the portion most susceptible to distension or displacement is the portion intermediate such surfaces, i. e., the hottest or least chilled portion. Obviously, the splitting effect at line f under the blowing operation does not continue beyond the depth necessary for the formation of bottom g, and hence the bottom rim portion c is in no way impaired.

The principles underlying the invention may be variously adapted and applied as obviously that part of the mold cavity in which a portion of the article is given final shape by blowing may be variously contracted for the pressing operation and expanded or enlarged for the blowing operation, this without disturbing the position of the article within the mold resulting from the pressing operation, and hence without impairing the dimension of the article longitudinal of the direction of pressure which is determined by the pressing operation.

I claim:

1. The method herein described of producing an open-end hollow glass article of smaller external cross-sectional area adjacent its open end than distant from said end, consisting in forming the full length of the article by pressing glass within a mold and by such pressing imparting final external shape to the full length of the article including the portion thereof of largest external cross-sectional area distant from its open end, the pressure-imparting plunger entering and imparting final shape to the interior of the open end of the article, retaining the article within the mold and with its length-defining exterior surfaces in contact with the mold faces that formed them, enlarging that portion of the mold cavity in axial line with and not reached by the plunger, and admitting compressed air into the mold-retained article for expanding the end portion thereof within the enlarged part of the mold.

2. The method herein described of forming an open-end hollow glass article, consisting in subjecting glass within a mold to plunger pressure and thereby imparting final shape to the exterior of the article and also by such pressure forming the article with an external depression in axial line with and extending toward the plunger but not reached by the latter, the glass surrounding said depression being relatively thick and with its opposite surfaces chilled by the mold faces which formed them, retaining the pressed article within the mold and removing the depression-forming mold part and then admitting compressed air into the plunger-formed cavity of the mold-retained article with such air acting on the face-chilled relatively thick glass surrounding said depression and operating to split such glass intermediate its chilled faces and thereby distend the depression-formed portion of the article and eliminate the depression.

3. The method herein described of producing an open-end hollow glass article of smaller external cross-sectional area adjacent its open end than distant from said end, consisting in forming the full length of the article by pressing glass within a mold and by such pressing imparting final external shape to the full length of the article including the portion thereof of largest external cross-sectional area distant from its open end, the pressure-imparting plunger entering and imparting final shape to the interior of the open end of the article, forming that portion of the article of largest external diameter with an external depression disposed toward and in axial line with the plunger but not reached by the latter and by such depression forming the portion of maximum external diameter with relatively thick side walls, retaining the pressure-formed article within the mold and enlarging that portion of the mold which formed the plunger-alining external cavity, and removing the plunger and admitting compressed air into the plunger cavity of the mold-retained article and thereby subjecting said relatively thick side walls to a splitting action with such splitting starting at the plunger-formed cavity and extending toward the extremity of the article and thereby distending the displaced glass into the enlarged portion of the mold and completing that part of the article which is distant from its open end.

4. The method herein described of completely forming a hollow glass article in a mold, the configuration of the mold corresponding to the external configuration to be imparted to the article, the mold shaped to form an external depression and corresponding inward bulge in the article, consisting in pressing molten glass in such mold and thereby imparting final external and internal configuration to the article save the depressed portion thereof, retaining the pressed article in the mold with the surface portions thereof which have been given final shape in contact with the mold surfaces which shaped them and enlarging the mold cavity by removing the depression-forming portion thereof, and then admitting air under pressure to the pressed cavity of the article and thereby distending the depression-formed portion of the article.

5. The method herein described of forming a hollow glass article by means of a mold and plunger with the plunger of less length than the mold and adapted to stop short of the bottom of the ultimate article, consisting in pressing molten glass in such mold with the mold imparting final shape to the full length of the exterior side portions of the article and with the plunger imparting final shape to a portion of the length of the interior of the article, forming by such pressure an external depression in that portion of the article in axial line with but not reached by the plunger, retaining the pressed blank in the mold and enlarging the mold cavity by eliminating the depression-forming mold part, and then admitting compressed air into the plunger-formed depression of the mold-retained article and thereby distending the depressed portion of the article to the full dimensions of the enlarged mold cavity.

6. The method herein described, consisting in pressing a hollow glass article within a mold of irregular contour and thereby imparting ultimate shape to the entire length of the external side portions of an article of irregular shape, retaining the pressed article within the mold with its irregular side portions fitting the corresponding irregular portions of the mold walls and enlarging the bottom portion of the mold cavity, and blowing the glass of the mold-retained article to distend it within the mold cavity enlargement without distorting the shape imparted by pressing to the full length of the exterior of the article.

7. The method herein described, consisting in providing a mold having the depth of its side portions corresponding to the full length of the ultimate article and shaped to impart full-length external side form to the article, the depth of the mold intermediate its side portions being less than at its side portions, pressing molten glass within the mold and thereby imparting full length and final external shape to the side portions of the article and with the central portion of the article shallower than the side portions, retaining the article thus formed within the mold and increasing the depth of that portion of the mold intermediate the formed side portions of the article, and then distending by air pressure the shallower central portion of the mold-retained glass without distorting the formed side portions thereof.

In testimony whereof I affix my signature in presence of two witnesses.

THEODORE C. STEIMER.

Witnesses:
JAMES BRYCE,
J. M. NESBIT.